3,262,854
METHOD FOR THE RECOVERY OF HEPARIN
Takamasa Yasuda, 868 Yukigaya-machi,
Ota-ku, Tokyo, Japan
No Drawing. Filed Mar. 29, 1963, Ser. No. 269,149
Claims priority, application Japan, Apr. 27, 1962,
37/16,592
6 Claims. (Cl. 167—74)

This invention relates to a method for the recovery of heparin from animal tissues.

Conventional processes for recovering heparin from animal tissues have suffered from markedly low yields owing to its loss of heparin caused by the combination with proteins, unless lengthy steps of autolysis or of hydrolysis with enzyme are applied before or after the extraction.

The quaternary ammonium salt addition process, which has recently been invented in the United States, so utilizes the strong bonding power of complex compounds that it is possible to omit the hydrolysis step and yet obtain a high unit crude heparin with relative ease, although not in satisfactory yield as yet.

The main features of the present invention reside in that, in contrast to the aforesaid process which omits hydrolysis, the present invention employs a simple, strong and novel hydrolysis and yet is much simpler than the conventional process which employs hydrolysis, as well as being more nearly quantitative than the aforesaid quaternary ammonium salt process.

Now, I have discovered that the reaction of an alkaline decoction of animal internal organs with picric acid under slightly alkaline conditions permits mild hydrolysis of proteins while inhibiting the tendency of said proteins to bond to heparin, and without adversely affecting the heparin. This fact is a basic element for achieving the present invention, which aims toward the quantitative recovery of heparin.

Picric acid is also useful as deproteinizing agent under acidic pH conditions. Therefore, if picric acid is continuously added even after the initial lixiviation step and then the pH is made acidic and then alkaline to effect alternately both hydrolysis and deproteinization or denaturalization of water-soluble protein, the protein tissues tend to be powdered to permit thorough hydrolysis as well as easier separation of the decoction without causing heat-coagulation of the proteins. In conventional processes (regardless of whether the autolysis step is employed or not), hydrolysis with enzyme or extraction of crude heparin is required after an alkaline decoction has once been separated from animal tissues. In accordance with the present invention, however, the aforesaid troublesome steps may be omitted and the three steps of lixiviation, hydrolysis and deproteinization can be accomplished in one step while maintaining all of the organs in the mixture, whereby crude heparin is quickly recovered without loss. This is an alternative procedure for achieving with ease the object of the present invention.

An embodiment of the present invention is illustrated in the following:

To finely divided or cut animal internal organs water and sodium hydroxide are added. The resulting mixture is adjusted to pH 11.3–12.0 and lixiviated for one and half hour at 50°–55° C. To the decoction, picric acid (and hydrochloric acid or sodium hydroxide, if necessary) is added to adjust the pH to about 8–9 and the reaction is carried out for one hour with occasional agitation. After adding hydrochloric acid to adjust the pH to 2.0–2.5, the decoction is allowed to stand for ½ hour or overnight at room temperature. The decoction is further aged for one hour after again being adjusted to a pH of about 8–9 by addition of sodium hydroxide. After adjusting the pH to 2.0–2.5 by further addition of hydrochloric acid, the decoction is allowed to stand for ½ to 3 hours at room temperature and then filtered. To the filtrate thus extracted an organic solvent capable of precipitating heparin, such as, methanol is added in twice the amount of the filtrate to form a precipitate of crude heparin, and the supernatant material is removed by suction. The precipitate is centrifuged, washed with acetone to remove lipids and subjected to vacuum drying. Since the resulting material still contains some water-soluble proteins or nucleic acid, it is dissolved in a small amount of water, deproteinized with picric acid and then twice the amount of acetone is added to the supernatant material to form a precipitate, which is then centrifuged and washed with acetone, followed by vacuum drying. The resulting crude heparin is substantially free from proteins. The hydrolysis with picric acid in preferably carried out at a pH between 7.5 and 9.5; increasing pH, tending to produce colored heparin. The picric acid for hydrolysis can be used in an amount sufficient to effect precipitation of the major proportion of protein. The solution should be maintained at 40°–60° C. during the hydrolysis.

The following examples illustrate the present invention in detail and show the results of comparative experiments with the quaternary ammonium salt process which were conducted by use of the same starting materials divided equally. The factor of heparin was examined in accordance with Japanese Pharmocopoeia, 7th edition.

*Example 1*

6 kg. of small intestine/mucosae of pigs which had been cut into about 10 cm. lengths, were divided into two portions and frozen overnight. To one portion, 3 kg., of said mucosae, 1.8 l. of water and 50 g. of sodium hydroxide were added and the resulting mixture was lixiviated at 50° C. for one and a half hours. To the decoction, 180 g. of picric acid was added to cause hydrolysis for one hour with occasional agitation. The resulting mixture was then aged overnight, at room temperature, after adjusting the pH to 2.5 with the addition of hydrochloric acid. After adding a 50% aqueous solution of 35 g. sodium hydroxide to adjust the pH to 9, the mixture was aged for one hour with occasional agitation. Then with the addition of 90 ml. of hydrochloric acid, the mixture was adjusted to pH 2.3, allowed to stand at room temperature for three hours and filtered to obtain 2.8 l. of filtrate. To the residue, 1.2 l. of water and 24 g. of sodium hydroxide were added. The resulting material was allowed to stand for one hour at 50° C., adjusted to pH 2.3 by the addition of hydrochloric acid, cooled and filtered, whereby 1.3 l. of a liquid containing a large amount of lipids was obtained. To the whole filtrate, twice the amount of methanol was added to form a precipitate. After removing the supernatant material by suction, the precipitate was centrifuged, washed with acetone and subjected to vacuum drying. The resulting material was dissolved in 180 l. of water and the solution, after the addition of picric acid, was heated to 60° C. and allowed to stand for three hours at room temperature. The precipitate was removed by centrifugation and twice the amount of acetone was added to the supernatant material to form a precipitate, which was then centrifuged, washed with acetone and dried in vacuo.

The weight of the resulting crude heparin was 4.05 g.; the analytical value, 46.8 u./mg.; and the yield, 189,540 u. This crude heparin was dissolved in 180 ml. of water, and 2 g. of barium chloride was added to the resulting solution. After 10 hours, the small quantity of the precipitate formed was removed by centrifugation. To the supernatant material, 100 ml. of acetic acid was added and the resulting solution was allowed to stand for 5 hours and then centrifuged. The precipitate thus obtained was washed with acetone and ether and dried in vacuo. The weight of the resulting barium salt was 1.38 g.; analytical value, 105.2 u./mg.; and yield, 145,200 u. To the mother liquor, from which the barium salt had been separated, 100 ml. of acetone was further added to precipitate barium salt, which was 365 mg. in weight, 72.2 u./mg. in analytical value and 26,350 u. in yield. Both barium salts were recrystallized together and converted into sodium salt. The weight of the sodium salt was 1.024 g.; analytical value, 123.0 u./kg.; and yield, 125,950 u.

For comparison, the results of experiments carried out according to the quaternary ammonium salt process (refer to Japanese patent publication No. 10,799/60, Examples 3 and 4) are shown in the following:

To an aqueous slurry containing the remaining 3 kg. portion of small intestine muscosae of pigs, of the 6 kg. sample referred to above, 1.5 l. of water, 380 g. of sodium sulfate, and sodium hydroxide in an amount sufficient to increase the pH to 11.5 were added, and the resulting mixture was lixiviated at 50° C. for one and half hours. To the resulting decoction, 150 g. of diatomaceous earth was added and the mixture was heated to 95° C. and then filtered. The residue was thoroughly washed with hot water. To the total filtrate of 4.8 l., 3% methyl isobutyl ketone was added and agitated to float and separate lipids. To the thus treated filtrate, were added 35 ml. of "Nissan Cation AB" solution (comprising about 23% of $$C_{18}H_{37}N(CH_3)_3Cl$$

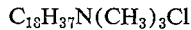

dissolved in isopropanol) and a small amount of methyl isobutyl ketone to float a complex compound. This complex compound was dissolved in 150 ml. of 2 N salt solution and filtered. To the filtrate, 0.7 part by volume of 95% alcohol was added to deposit crude heparin (weight: 890 mg., analytical value: 99.5 u./mg., yield: 88.450 u.). This crude heparin was dissolved in 60 ml. of water and 1 g. of barium chloride was added to the solution. 10 hours later, the precipitate formed was removed by centrifugation. To the supernatant material, 40 ml. of acetic acid was added and the precipitate was washed, after centrifugation, with acetone and ether, followed by vacuum drying.

The weight of the resulting barium salt was 681 mg.; analytical value, 125.3 u./mg.; and yield, 85,330 u.

*Example 2*

After having been frozen overnight, 6 kg. of fresh beef lung were mashed and divided into two equal portions. To one portion, 3 kg. of said lung, 4.8 l. of water and 50 g. of sodium hydroxide were added and the resulting mixture was subjected to alkali lixiviation at 55° C. for one and a half hours. To the resulting decoction, 500 g. of picric acid and 100 ml. of 50% sodium hydroxide solution were gradually added and the mixture was aged for one hour with occasional agitation. Subsequently, the pH of the mixture was lowered to less than 2.5 by adding 105 ml. of hydrochloric acid at room temperature. Two hours later, 45 ml. of 50% sodium hydroxide solution was added to the mixture which was then aged for two hours while agitating occasionally. The mixture was adjusted to pH 2.3 by the further addition of 120 ml. of hydrochloric acid, allowed to stand for three hours at room temperature, and then filtered to obtain 3.6 l. of filtrate. To the filtrate, methanol in twice the amount of the filtrate was added to form a precipitate. The supernatant material was removed by suction, while the precipitate was washed with acetone and ether and dried in vacuo. The resulting crude heparin was 5.22 g. in weight, 19.8 u./mg. in analytical value and 103,500 u. in yield. This crude heparin was dissolved in 150 ml. of water and the resulting solution was heated, after the addition of 5 g. of picric acid, to 60° C. to dissolve the picric acid, cooled and the precipitate formed was removed by centrifugation. The supernatant material was precipitated by the addition of acetone in twice the amount thereof, centrifuged, washed with acetone and ether and subjected to vacuum drying. The resulting crude heparin was 3.57 g. in weight, 25.2 u./mg. in analytical value and 90.130 u. in yield. This crude heparin was fractionated with alcohol and barium salt was prepared from the resulting 65% alcohol precipitate. The barium salt was 895 mg. in weight, 86.2 u./mg. in analytical value and 77.150 u. in yield.

Results of an experiment carried out by applying the quaternary ammonium salt process to the remaining 3 kg. of the starting material used in Example 2 are shown in the following: To 3 kg. of the beef lung, 4.5 l. of water. 60 g. of sodium hydroxide and 450 g. of sodium sulfate were added and the resulting mixture was subjected to alkali lixiviation at 55° C. for one and one-half hours. The resulting decoction was adjusted to pH 7.7 by adding 120 g. of aluminum sulfate and 15 g. of sulfuric acid. Subsequently, 150 g. of diatomaceous earth was added to the mixture, which was then rapidly heated to 95° C. and filtered. The residue was washed with 1.5 l. of hot water. The total amount of filtrate was 5.55 l. After adding 160 ml. of methyl isobutyl ketone, the filtrate was agitated and allowed to stand overnight and then the upper layer was separated and removed. To the filtrate thus treated, 35 ml. of "Cation AB" and 30 ml. of methyl isobutyl ketone were added to float and separate a complex compound. The complex compound was dissolved in 100 ml. of 2 N salt solution and filtered. To the filtrate, 70 ml. of 95% alcohol was added to form a precipitate of crude heparin. This crude heparin was 514.5 mg. in weight, 55.2 u./mg. in analytical value and 28,110 u. in yield. The crude heparin was further subjected to alcohol fractionation precipitation to form a precipitate of 65% alcohol, which was then converted into barium salt. The barium salt was 305 mg. in weight, 83 u./mg. in analytical value and 25,300 u. in yield. To the mother liquor, from which the initial complex compound had been separated, 40 ml. of "Cation AB" was further added to float and separate a complex compound, which was then converted into a crude heparin. This crude heparin was 2,182 g. in weight, 16.5 u./mg. in analytical value and 36,000 u. in yield. When purified into sodium salt, this crude heparin suffered much loss and its analytical value could not be increased. The barium salt was 372 mg. in weight, 39.2 u./mg. in analytical value, and 14,600 u. in yield. When purified into barium salt, this crude heparin suffered substantial loss and its analytical value could not be increased. The barium salt was 372 mg. in weight, 39.2 u./mg. in analytical value, and 14,600 u. in yield.

As seen from the results of the above comparative experiments, the present invention yields about 1.5 to 2 times as much crude product, and at least 1.4 to 1.5 times as much purified product, as is obtained in accordance with the quaternary ammonium salt process.

*Example 3*

4.5 kg. of small intestine mucosae of pigs (10% solids) were cut and frozen overnight. To the frozen mass, 3.2 l. of water, 60 g. of sodium hydroxide and 40 g. of sodium chloride were added to a mixture having a pH of about 11.8. The resulting mixture was lixiviated at 55° C. for 1.5 hours. To the decoction, 270 g. of picric acid was added. After 30 minutes, 90 ml. of hydrochloric acid was added, and the resulting mixture was stirred at pH 2.3 for ½ hour. To the mixture, about 40 g. of sodium hydroxide was added to adjust the pH to 9.0–8.0, and stirring was continued for one hour. At that time, 110 ml. of hydrochloric acid was added and then the resulting mixture was cooled for one hour. It was filtered to give a filtrate of 5.2 l. To the remaining residue, 1.4 l. of water and about 28 g. of sodium hydroxide was added. At a pH of 9.0–8.0, the mixture was stirred at 60° C. for 30 minutes. Thereafter, 105 ml. of hydrochloric acid was added and the mixture was cooled at pH 2.3. After one hour, it was filtered to give 1.6 l. of a filtrate. To the combined filtrates, twice the volume of methanol was added to cause precipitation. Analysis of the precipitate thus obtained showed its potency to be 13.37 u./mg. Yield 66,700 u./kg.

This precipitate was dissolved in 240 ml. of water, and to the resulting solution was added 18 g. picric acid and 4 g. sodium hydroxide. The resulting mixture was adjusted to pH 9.5–8.5, at which mild hydrolysis of protein was effected for one hour at 55° C.

After cooling, 1/10 mol hydrochloric acid was added to the mixture which was allowed to stand overnight at 5° C. after which the precipitate was removed by centrifuging.

To the supernatant material, acetone in an amount equal to twice the volume of the supernatant material was added to form a precipitate of the crude heparin, which was then centrifuged and washed with acetone and ether, followed by vacuum drying. To 1 ml. of a solution of this crude heparin (1 in 100) was added five drops of trichloro acetic acid solution (1 in 5). No precipitate or turbidity occurred. Analysis of this crude heparin showed its potency to be 36.6 u./mg. Yield 60,100 u./kg.

The crude heparin was dissolved in 240 ml. of water, and then 4.8 g. of barium chloride and 200 ml. of acetic acid were added to the resulting solution.

The precipitated barium salt was centrifuged, washed with acetone and ether and dried in vacuo.

Potency, 102.3 u./mg. Yield, 58,500 u./kg.
Sodium salt potency, 114.7 u./mg. Yield, 58,000 u./kg.

As evident from the above, the crude heparin obtained by the present invention is not only high in yield but does not form any pyrogenic material during the manufacturing process which is much simpler than the prior processes. Moreover, the loss of heparin is relatively small when purified in the form of barium salt and its medical efficiency is increased sufficiently to compensate for the small loss in material. Therefore, the crude heparin produced by the present invention is clearly a highly desirable material.

What I claim is:

1. A method for the recovery of heparin from animal tissue containing the same, comprising the steps of adding picric acid to an aqueous alkaline decoction of the animal tissue and then maintaining the resulting mixture until the protein is hydrolyzed to lose its bonding power for heparin.

2. A method for the recovery of heparin from animal tissue containing the same, comprising the steps of subdividing the animal tissue, treating the subdivided animal tissue with an aqueous alkaline solution at about 50–55° C. for more than one hour, adding picric acid to the decoction and maintaining the resulting alkaline mixture at a temperature higher than room temperature until the protein is hydrolyzed to lose its bonding power for heparin.

3. The method of claim 2, wherein the said aqueous alkaline solution is an aqueous solution containing sodium hydroxide.

4. The method of claim 2, wherein the subdivided animal tissue is allowed to stand overnight at a temperature of −5° to −10° C. prior to lixiviation.

5. A method for the recovery of heparin from animal tissue containing the same, which comprises subdividing the animal tissue; treating the subdivided mass with an aqueous sodium hydroxide solution at about 50–55° C. for at least one hour; adding picric acid to the resulting decoction and maintaining the resulting alkaline mixture at about 50–55° C. until the protein which would precipitate under acidic conditions is hydrolyzed to lose its bonding power to heparin, treating the mixture with sodium hydroxide to effect hydrolysis of proteinous materials; thereafter treating the same with hydrochloric acid to remove proteinous materials therefrom; filtering the mixture; adding an organic solvent capable of precipitating heparin to the filtrate obtained; recovering the resulting precipitate by centrifugal separation and treating it with an aqueous picric acid solution to effect hydrolysis and removal of the protein; and then recovering crude protein-free heparin from the treated mixture.

6. A method for the recovery of heparin from animal tissue containing the same, which comprises subdividing the animal tissue; treating the subdivided mass with an aqueous sodium hydroxide solution at about 50–55° C. for at least one hour; adding picric acid to the resulting decoction and maintaining the resulting alkaline mixture at about 50–55° C. until the protein which would precipitate under acidic conditions is hydrolyzed to lose its bonding power to heparin; carrying out treatments of the mixture with hydrochloric acid and then with sodium hydroxide to effect denaturalization and hydrolysis of proteinous materials; thereafter treating the same mixture with hydrochloric acid to remove proteinous materials therefrom; filtering the mixture; adding an organic solvent capable of precipitating heparin to the filtrate obtained; recovering the resulting precipitate by centrifugal separation and treating it with an aqueous picric acid solution to effect hydrolysis and removal of the protein; and then recovering crude, protein-free heparin from the treated mixture.

References Cited by the Examiner

UNITED STATES PATENTS 2,797,184   6/1957   Coleman _____ 167—74

JULIAN S. LEVITT, *Primary Examiner.*

FRANK CACCIAPAGLIA, Jr., *Examiner.*

S. ROSEN, *Assistant Examiner.*